US 6,570,365 B1

(12) United States Patent
Hsu

(10) Patent No.: US 6,570,365 B1
(45) Date of Patent: May 27, 2003

(54) DEVICE CAPABLE OF INCREASING ROTATION SPEED OF MAGNETO MOTOR

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 0 days.

(21) Appl. No.: 10/072,959

(22) Filed: Feb. 12, 2002

(51) Int. Cl.$^7$ .............................. H02P 7/06; H02K 11/00
(52) U.S. Cl. .............................. 322/37; 322/46; 322/29; 310/68 B
(58) Field of Search .............................. 322/37, 29, 46, 322/47; 310/68 B, 67 R, 68 R

(56) References Cited

U.S. PATENT DOCUMENTS

| | | | | |
|---|---|---|---|---|
| 5,469,005 A | * | 11/1995 | Asama et al. .............. | 310/68 B |
| 5,550,457 A | * | 8/1996 | Kusase et al. ................ | 322/29 |
| 6,114,785 A | * | 9/2000 | Horng ...................... | 310/68 B |
| 6,249,067 B1 | * | 6/2001 | Schob et al. .............. | 310/68 B |
| 6,285,101 B1 | * | 9/2001 | Kazama et al. ........... | 310/68 B |

* cited by examiner

Primary Examiner—Thanh Lam
(74) Attorney, Agent, or Firm—Rosenberg, Klein & Lee

(57) ABSTRACT

Several sets of magnetic sensors are provided in a magneto motor to sense rotary pole variation of the rotor magnet. One set of magnetic sensors lets the stator portion and the rotor portion generate armature reaction of stronger magnetic flux density, and another set of magnetic sensors corresponds to rotary pole variation of the permanent magnet of the rotor portion in advance to let the motor generate weak magnetic control phenomenon so that the stator portion and the rotor portion generate armature reaction of weaker magnetic flux density. The torsion coefficient $K_T$ will decrease to increase the rotation speed of the rotor portion. A motor can be designed to have a larger $K_T$. When the motor needs to operate at higher rotation speeds, a magnetic detection selection circuit will output a detection output signal letting the motor generate a lower $K_T$ to increase the rotation speed of the magneto motor.

13 Claims, 5 Drawing Sheets

DEVICE CAPABLE OF INCREASING ROTATION SPEED OF MAGNETO MOTOR

FIELD OF THE INVENTION

The present invention relates to a device capable of increasing the rotation speed of a magneto motor and, more particularly, to a plurality of sets of magnetic sensors provided in a magneto motor to sense rotary pole variation of a permanent magnet of the rotor and let exciting coils of the stator have different conduction time differences and torsion coefficients $K_T$ of different strengths so that the same motor can generate various kinds of different rotation speeds.

BACKGROUND OF THE INVENTION

To manufacture an electromotor of high operational efficiency, an appropriate value of the torsion coefficient $K_T$ must be designed and matched with the operational range of the electromotor, as illustrated with the following formulas.

$$E = K_E \cdot \Omega$$

$$K_E = B \cdot D \cdot L \cdot Z / 2$$

$$T = K_T \cdot I_a$$

$$K_T = B \cdot D \cdot L \cdot Z / 2$$

wherein E is the counter electromotive force voltage (volt), T is the output torsion (N–m), $K_E$ is the counter electromotive force coefficient, $K_T$ is the torsion coefficient, $\Omega$ is the rotation speed of the armature (rad/sec), $I^a$ is the armature current (ampere), B is the magnetic flux density of the gap (gauss), D is the outer diameter of the armature (cm), L is the superimposed thickness (cm), and Z is the total number of turns of conductors.

As can be seen from the above formulas, the counter electromotive force coefficient $K_E$ equals the torsion coefficient $K_T$, and the counter electromotive force coefficient $K_E$ is inversely proportional to the rotation speed of the armature $\Omega$. Therefore, for a fixed counter electromotive force voltage E, if the normal rated rotation speed of the armature $\Omega$ is lower, the value of the counter electromotive force coefficient $K_E$ will be relatively higher, while if the normal rated rotation speed of the armature $\Omega$ is higher, the value of the counter electromotive force coefficient $K_E$ will be relatively lower. If a motor is designed to have a higher normal rated rotation speed of the armature $\Omega$, the value of the torsion coefficient $K_T$ will be relatively lower so that the torsion T ($T = K_T \cdot I_a$) can only be increased with a higher armature current $I_a$ if the motor is operated at a lower rotation speed. If a motor is designed to have a higher torsion coefficient $K_T$, the motor will not accomplish a higher normal rated rotation speed $\Omega$ because $K_T = K_E$ and $E = K_E \cdot \Omega$.

The present invention can let a motor have a higher torsion coefficient $K_T$. Moreover, the present invention can switch to magnetic sensors sensing angle in advance to let the armature of the motor generate the effect of weak magnetic control, hence reducing the magnetic flux density of the armature gap. From the above formulas $K_E = B \cdot D \cdot L \cdot Z / 2$ and $E = K_E \cdot \Omega$, because the magnetic flux density B of the armature gap decreases, the counter electromotive force coefficient $K_E$ consequentially decreases. Therefore, the rotation speed of the armature, $\Omega$, will inevitably increase.

The torsion coefficient $K_T$ of the prior art motor is a single value. For a motor usually operating in the range of lower rotation speeds and sometimes operating in the range of higher rotation speeds (e.g., a light electric vehicle), in order to let the motor operate in the seldom work range of the highest rotation speed when necessary, because $K_E = K_T$, $E = K_E \cdot \Omega$, and $T = K_T \cdot I_a$, the torsion coefficient $K_T$ and the counter electromotive force coefficient $K_E$ must decrease for increasing the rotation speed $\Omega$ to the seldom work range of the highest rotation speed if the counter electromotive force voltage E is fixed. Because the torsion coefficient $K_T$ decreases, and the motor usually operates in the range of lower rotation speeds, the armature current $I_a$ must increase to increase the torsion T because $T = K_T \cdot I_a$. However, a too large $I_a$ is not good to the operational efficiency of the motor. This can be known from the following formula.

$$P = I^2 \cdot R$$

wherein P is the dissipated power of the coil of an electromotor, I is the armature current, and R is the impedance of the coil. Therefore, if the torsion of a motor is increased by increasing the armature current, the dissipated power of the stator coil will increase squarely, and heat will be generated in the impedance of the coil. The impedance of the coil will correspondingly rise due to the temperature rise of the metallic coil. This vicious circle will let the motor operate in an environment of high temperature, hence resulting in a worse output efficiency.

SUMMARY OF THE INVENTION

A stator portion of a conventional motor is formed by winding a single coil. Therefore, the torsion coefficient $K_T$ and the counter electromotive force coefficient $K_E$ thereof are consequentially constant values. If a motor is designed to have higher values of the $K_T$ and $K_E$, the rotation speed of the armature, $\Omega$, will decrease proportionally. In the present invention, a plurality of sets of magnetic sensors are provided in a magneto motor to sense rotary pole variation of a permanent magnet of the rotor. A set of magnetic sensors is provided at the position of the stator portion letting the difference between the conduction time of the stator's exciting coil and the rotary pole variation time of the rotor be zero or lower so that the motor can generate the strongest or stronger torsion coefficient $K_T$. Another set of magnetic sensors is provided at the position of the stator portion letting the difference between the conduction time of the stator's exciting coil and the rotary pole variation time of the rotor be longer so that the motor can generate a phenomenon similar to weak magnet control. Detection signals of the magnetic sensors are controlled by a magnetic detection signal selection circuit, and are integrated to output a detection output signal to a motor drive and control circuit, which lets the stator portion and the magneto rotor portion generate armature reactions of different strengths.

The above weak magnetic control device capable of increasing the rotation speed of a motor when necessary can let the motor have a larger torsion coefficient $K_T$. When a motor of larger $K_T$ value operates at lower rotation speeds, because the armature current $I_a$ can be decreased proportionally ($T = K_T \cdot I_a$), the dissipated power of the stator coil of the motor will also decrease ($P = I^2 \cdot R$), thereby reducing the working temperature of the motor and increasing the operational efficiency of the motor operating at lower rotation speeds.

The various objects and advantages of the present invention will be more readily understood from the following detailed description when read in conjunction with the appended drawing, in which:

DETAILED DESCRIPTION OF THE PREFERRED EMBODIMENTS

Figure 1:
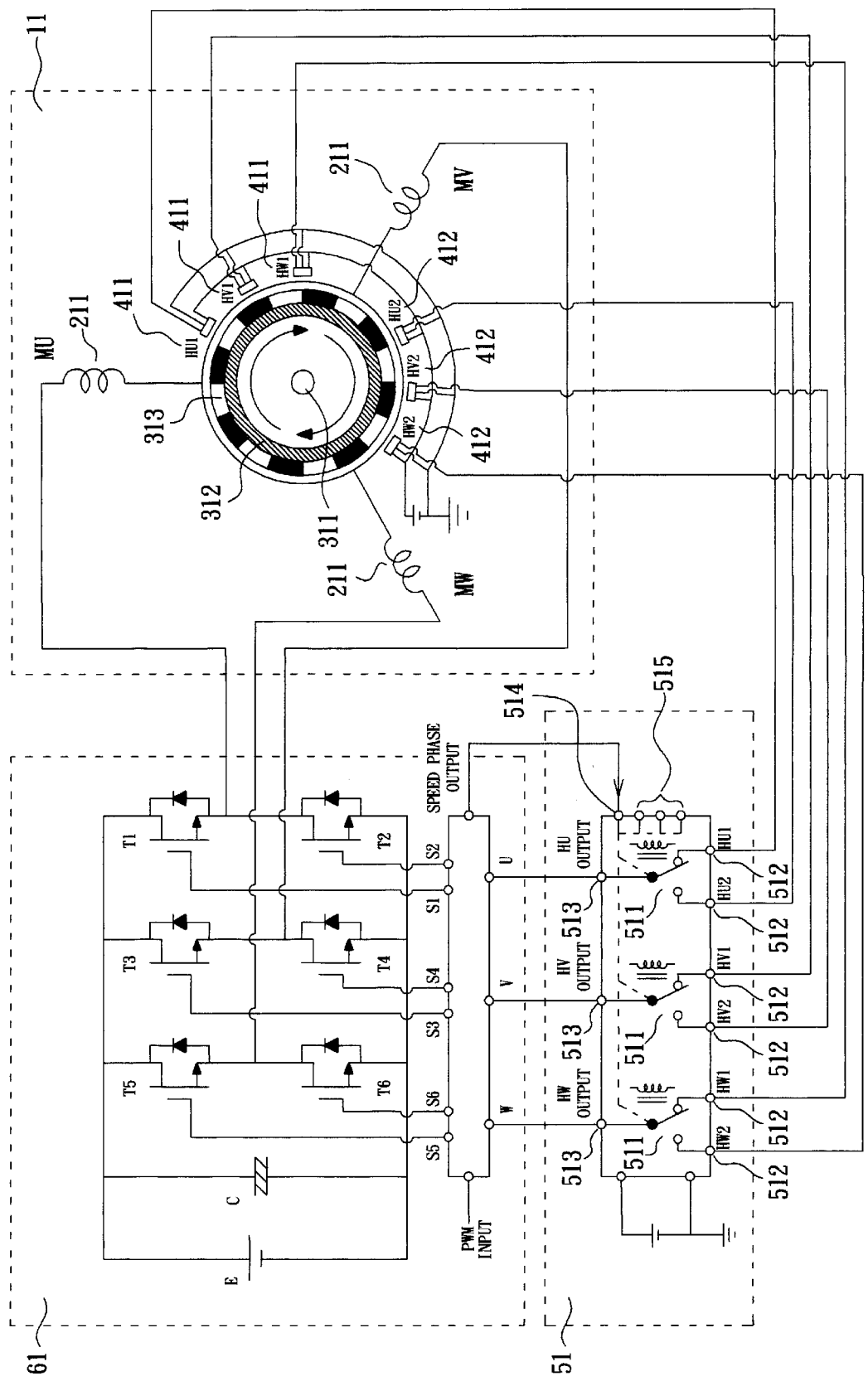
FIG. 1 is a diagram showing the circuit connection according to an embodiment of the present invention.
Figure 2:
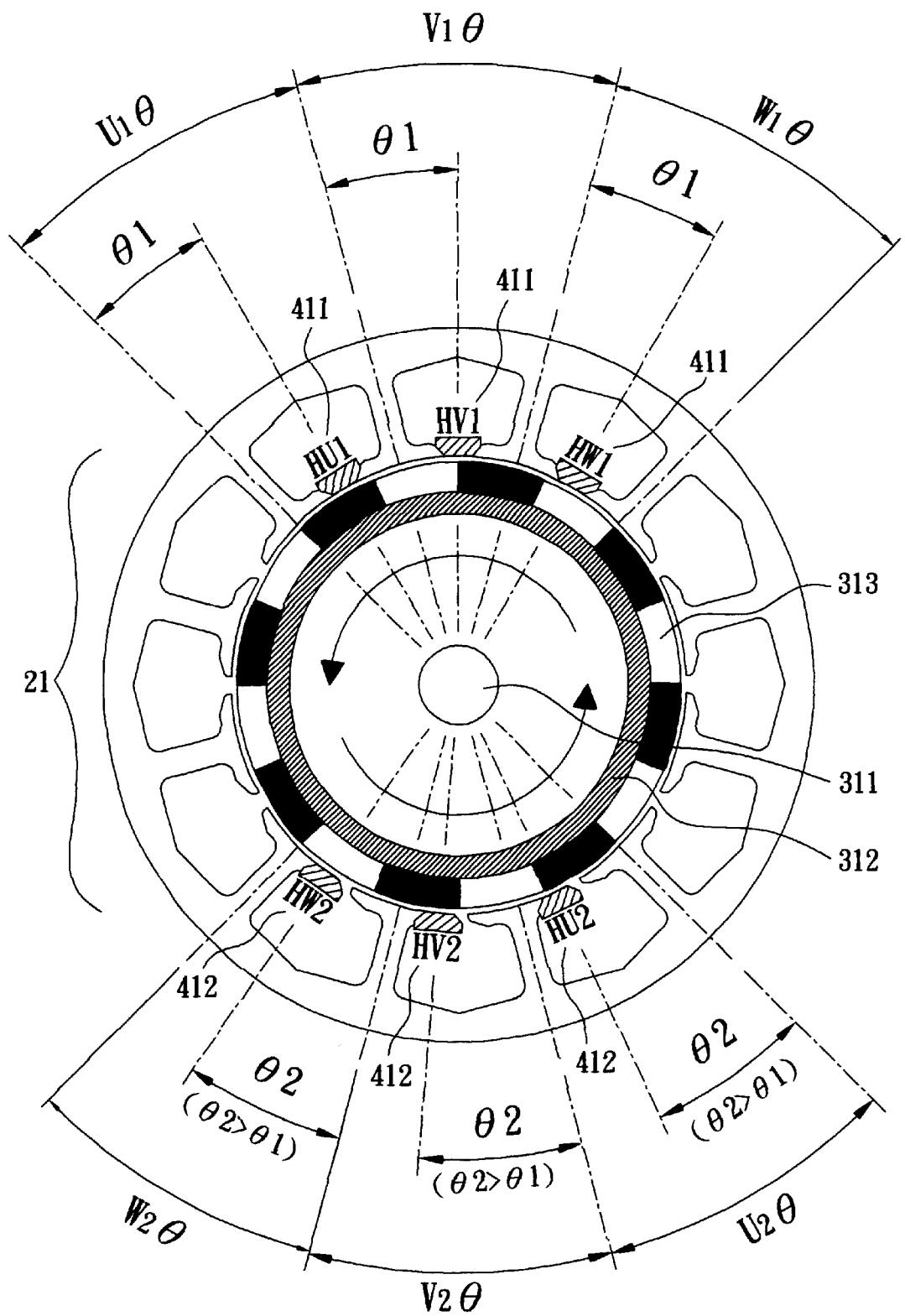
FIG. 2 diagram showing positions and angles of a rotor portion, a stator portion, and a plurality of magnetic sensors according to an embodiment of the present invention.
Figure 3A:
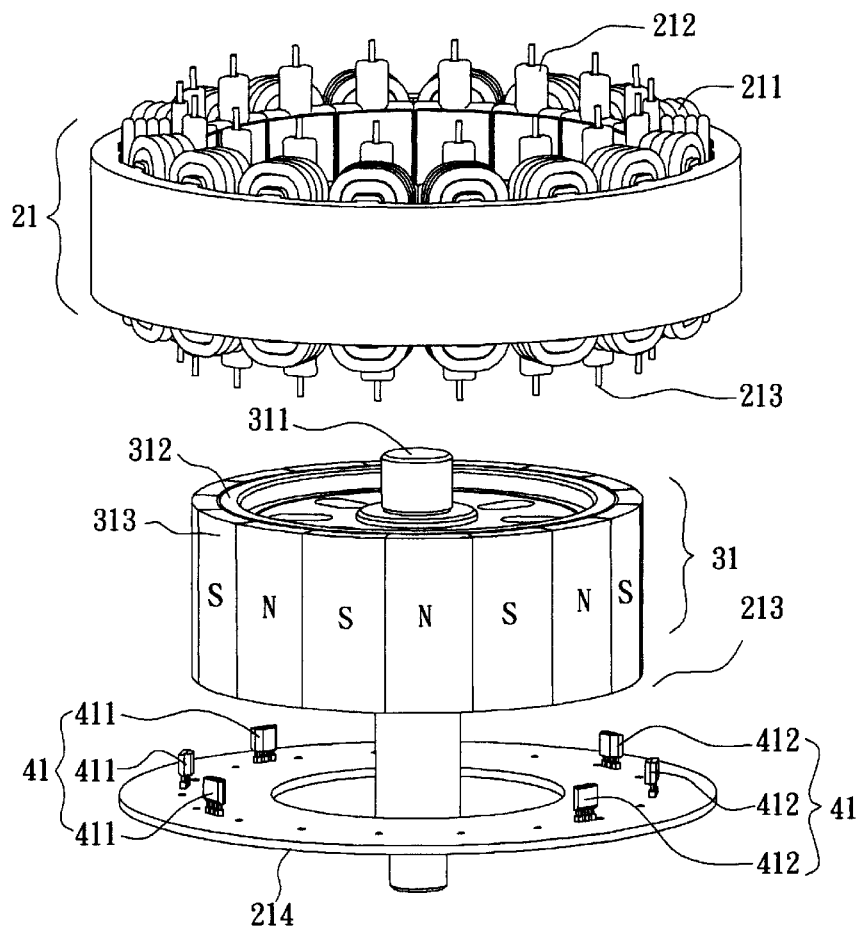
FIGS. 3A and 3B are perspective assembly views showing positions and angles of an inner rotor portion and a plurality of magnetic sensors according to an embodiment of the present invention.
Figure 3B:
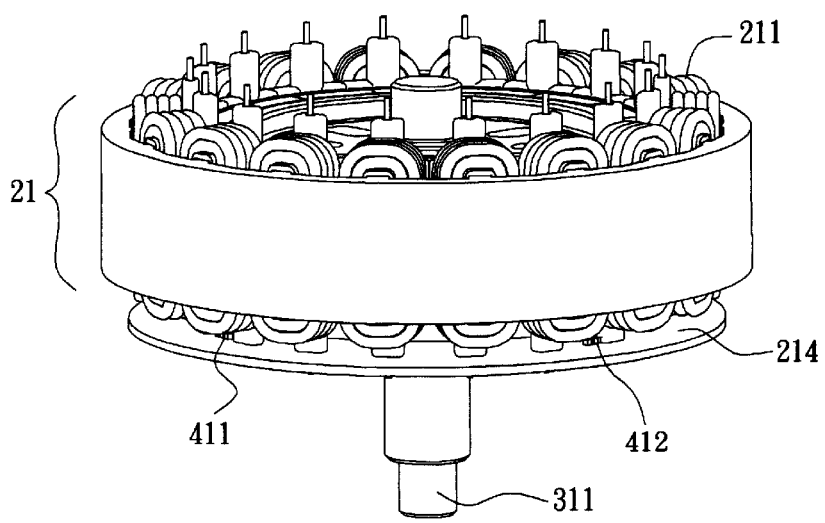
Figure 4A:
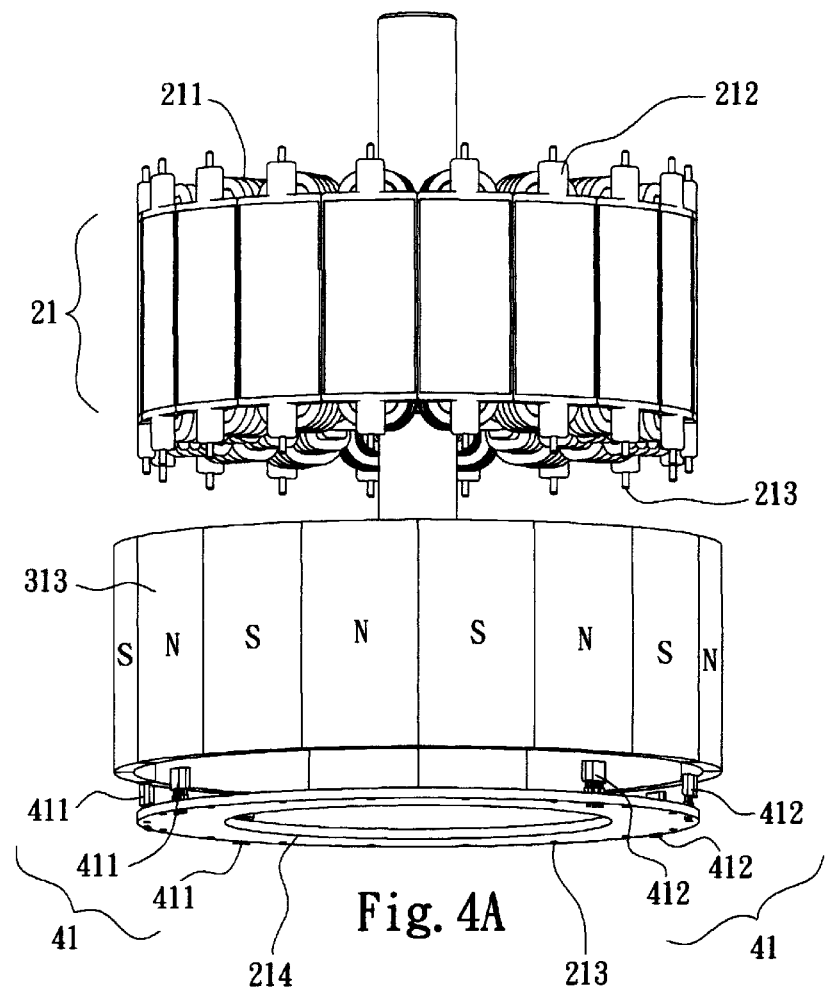
FIGS. 4A and 4B are perspective assembly views showing positions and angles of an outer rotor portion and a plurality of magnetic sensors according to an embodiment of the present invention.
Figure 4B:
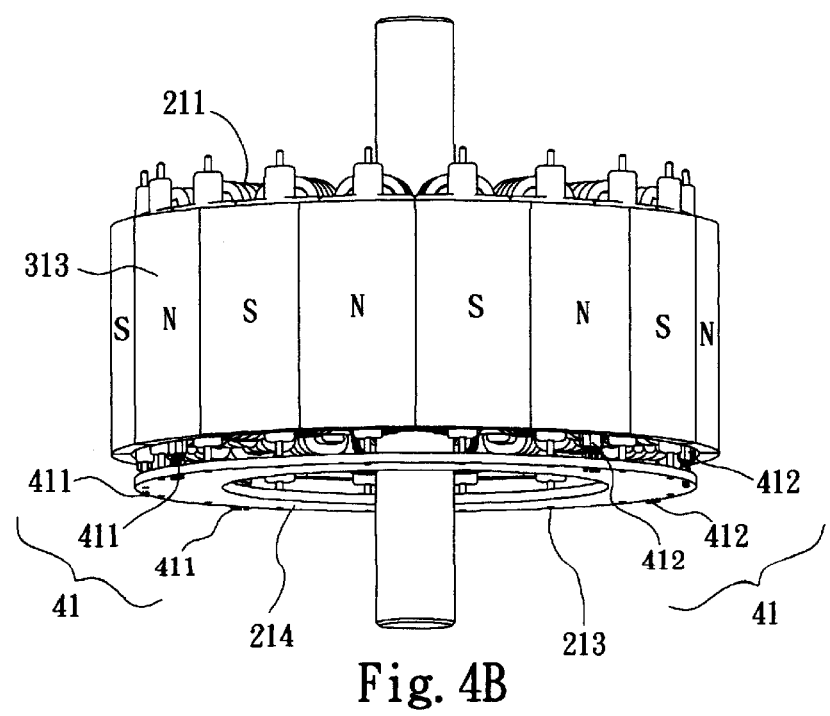
Figure 5A:
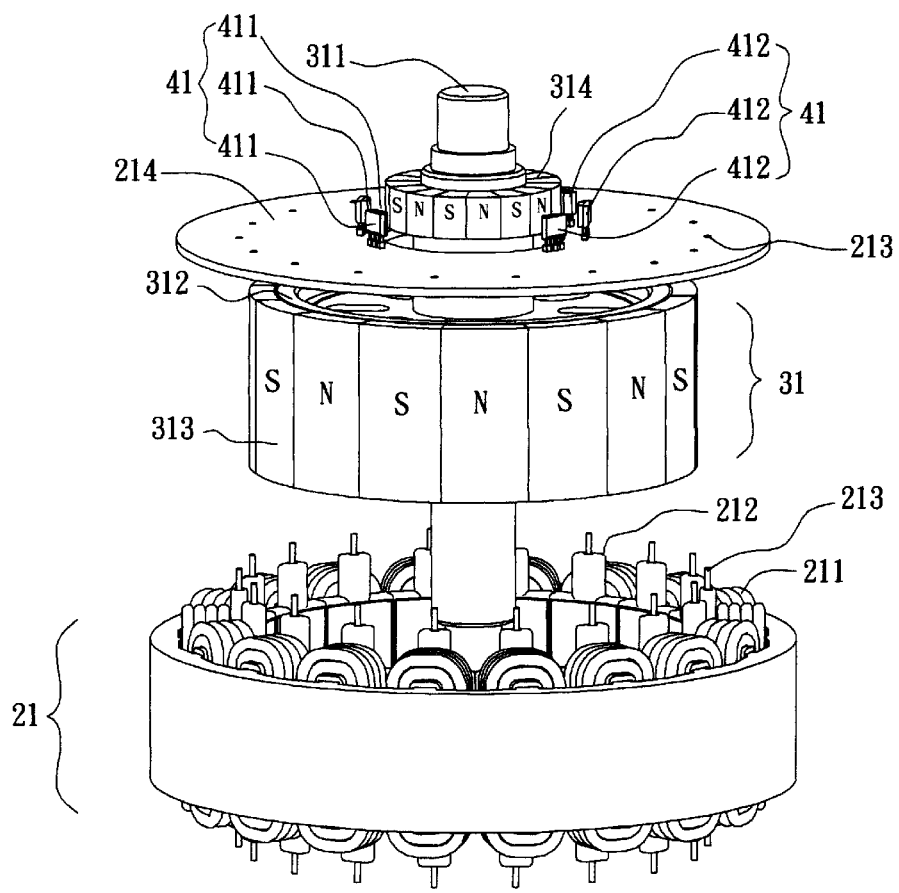
FIGS. 5A and 5B are diagrams of a rotary position sensing permanent magneto not for armature reaction of a rotor according to an embodiment of the present invention.
Figure 5B:
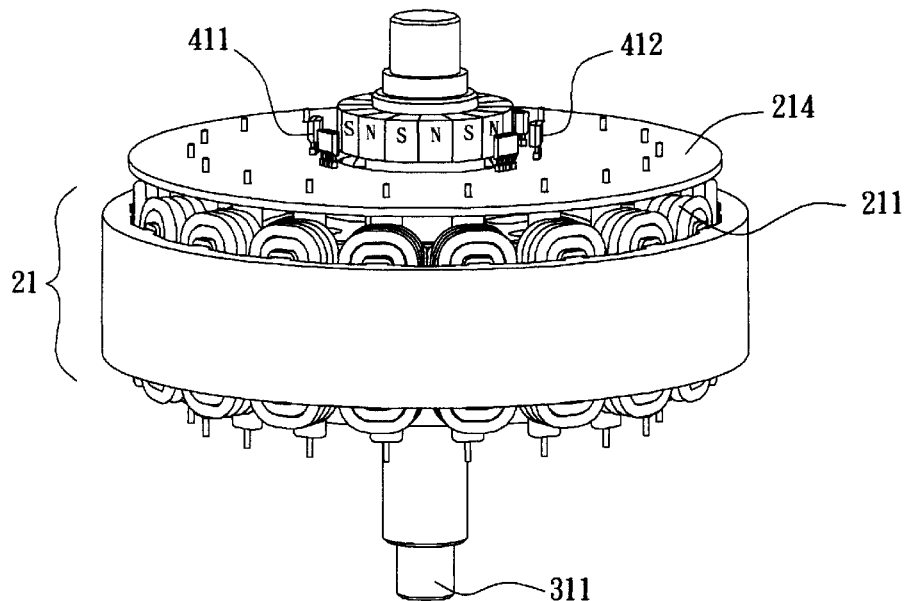

As shown in FIGS. 1 to 5, the present invention provides a device capable of increasing the rotation speed of a magneto motor. The device comprises a magneto motor 11, a plurality of sets of magnetic sensors 41, and a magnetic detection signal selection circuit 51.

The magneto motor 11 comprises a stator portion 21 and a rotor portion 31 therein. The stator portion 21 is provided to let exciting coil windings 211 be disposed therein. The stator portion 21 also comprises stator wire grooves 212, positioning devices 213, and a circuit board 214, and provides devices for positioning a plurality of sets of magnetic sensors 41. The rotor portion 31 is a rotary rotor having permanent magnets. The rotor portion 31 is pivotally connected to the stator portion 21 via a pivot 311. The rotor portion 31 corresponds to the stator portion 21 so that an armature can react to rotate. A motor drive and control circuit 61 is also provided to control the magneto motor 11.

The plurality of sets of magnetic sensors 41 are installed at the stator portion 21 with different angles, and are used to sense rotary pole variation of the permanent magnet of the rotor portion 31. The magnetic sensors 41 include a magnetic sensor 411 of angle θ1 and a magnetic sensor of angle θ2. The magnetic sensors 41 can let the exciting coils 211 of the stator portion 21 and the rotary pole of the rotor portion 31 generate variation relations of different angles. That is, synchronous or advance phenomenon of conduction time difference between the detection signal and the exciting coils will occur, thereby generating various kinds of armature reactions of different strengths.

The magnetic detection signal selection circuit 51 controls terminal instructions via a rotation speed signal terminal 514 to let the plurality of sets of magnetic sensors 41 integrate a detection output signal 513. Various kinds of detection output signals 513 will let the exciting coils of the stator portion 21 have different conduction time differences. Various kinds of conduction time differences will let the stator portion 21 and the rotor portion 31 generate individual constant armature gas magnetic flux densities. The individual constant magnetic flux densities will generate individual constant torsion coefficients $K_T$. The magneto motor 11 can thus generate various kinds of operational rotation speeds.

The positions of the plurality of sets of magnetic sensors 41 should not be limited, but the positioned angle of one of the magnetic sensors 41 will let the conduction time difference of the exciting coils of the stator portion 21 and the rotor portion 31 generate the strongest air gap magnetic flux density and armature reaction of the largest torsion coefficient $K_T$, while the positioned angle of at least another magnetic sensor 41 will let the conduction time difference of the exciting coils of the stator portion 21 and the rotor portion 31 generate weaker air gap magnetic flux density and armature reaction of smaller torsion coefficient $K_T$.

The positions of the plurality of sets of magnetic sensors 41 should not be limited, but the positioned angle of one of the magnetic sensors 41 will let the conduction time difference of the exciting coils of the stator portion 21 and the rotor portion 31 generate stronger air gap magnetic flux density and armature reaction of the larger torsion coefficient $K_T$, while the positioned angle of at least another magnetic sensor 41 will let the conduction time difference of the exciting coils of the stator portion 21 and the rotor portion 31 generate weaker air gap magnetic flux density and armature reaction of smaller torsion coefficient $K_T$.

The selection of the detection output signals 513 of the magnetic detection signal selection circuit 51 can be accomplished by referring to the level of the rotation speed of the motor to generate a rotation speed signal. The instruction signal terminal 514 will let the magnetic detection signal selection circuit 51 automatically select to output different detection output signals 513 according to the level of the rotation speed of the motor.

The selection of the detection output signals 513 of the magnetic detection signal selection circuit 51 can be accomplished to generate switching signals in manual switching way. The instruction signal terminal 514 will let the magnetic detection signal selection circuit 51 automatically select to output different detection output signals 513 according to the state of manual selection.

The magnetic detection signal selection circuit 51 includes a switch 511 therein, which can be of mechanical type having contacts. The switch 511 is controlled by instructions of the signal terminals 514 and 515 to output the required detection output signal 513.

The magnetic detection signal selection circuit 51 includes a switching circuit therein, which can be an electronic integrated circuit (IC) without contacts like an analog IC, a digital IC, or a central processing unit (CPU). The electronic semiconductor circuit is controlled by instructions of the signal terminals 514 and 515 to output the required detection output signal 513.

The stator portion 21 can be an outer stator portion, and the rotor portion 31 is a magneto inner rotor portion, i.e., a magneto inner rotor type motor.

The stator portion 21 can also be an inner stator portion, and the rotor portion 31 is a magneto outer rotor portion, i.e., a magneto outer rotor type motor.

The permanent magnet 313 of the rotor portion 31 is a tube-shaped magnet adhered on the surface of the magnetic conduction iron yoke 312 for armature reaction of the rotor portion. The plurality of sets of magnetic sensors 41 correspond to rotary pole variation of the permanent magnet 313 to let the rotor portion 31 correspond to the stator portion 21 so that an armature can react to rotate.

The permanent magnet 313 of the rotor portion 31 is formed by individually adhering a plurality of permanent magnets on the surface of the magnetic conduction iron yoke 312 for armature reaction of the rotor portion. The plurality of sets of magnetic sensors 41 correspond to rotary pole variation of the permanent magnet 313 to let the rotor portion 31 correspond to the stator portion 21 so that an armature can react to rotate.

The permanent magnet of the rotor portion 31 is formed by individually embedding a plurality of permanent magnets into the magnetic conduction iron yoke 312 for armature reaction of the rotor portion. The plurality of sets of magnetic sensors 41 correspond to rotary pole variation of the permanent magnet 313 to let the rotor portion 31 correspond to the stator portion 21 so that an armature can react to rotate.

The permanent magnet of the rotor portion 31 is another permanent magnet 314 concentric to and synchronously rotating with the rotor portion 31. The permanent magnet 314 is for detection of rotation position of the rotor but not for armature reaction. The plurality of sets of magnetic sensors 41 correspond to rotary pole variation of the permanent magnet 314 to let the permanent magnet 313 for armature reaction of the rotor portion 31 correspond to the stator portion 21 so that an armature can react to rotate.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A device capable of increasing the rotation speed of a magneto motor, comprising:
    a magneto motor comprising a stator portion and a rotor portion, said stator portion being provided to let exciting coil windings be disposed therein, said rotor portion being a rotary rotor having a permanent magnet, said rotor portion corresponding to said stator so that an armature can react to rotate;
    a plurality of sets of magnetic sensors installed at said stator portion with various kinds of angles and used to sense rotary pole variation of the permanent magnet of said rotor portion, the exciting coils of said stator portion and the rotary pole of said rotor portion thus generating variation relations of different angles, synchronous or advance phenomenon of conduction time difference between the detection signal and the exciting coils occurring, thereby generating various kinds of armature reactions of different strengths; and
    a magnetic detection signal selection circuit letting said plurality of sets of magnetic sensors integrate a detection output signal via instructions of signal terminals, various kinds of detection output signals letting the exciting coils of said stator portion have different conduction time differences, various kinds of conduction time differences letting said stator portion and said rotor portion generate individual constant armature air gap magnetic flux densities, individual constant magnetic flux densities generating individual constant torsion coefficients $K_T$ so that said magneto motor can generate various kinds of operational rotation speeds.

2. The device capable of increasing the rotation speed of a magneto motor as claimed in claim 1, wherein positions of said plurality of sets of magnetic sensors should not be limited, but the positioned angle of one set of said magnetic sensors will let the conduction time difference of the exciting coils of said stator portion and said rotor portion generate the strongest air gap magnetic flux density and armature reaction of the largest torsion coefficient $K_T$, while the positioned angle of at least another set of said magnetic sensors will let the conduction time difference of the exciting coils of said stator portion and said rotor portion generate weaker air gap magnetic flux density and armature reaction of smaller torsion coefficient $K_T$.

3. The device capable of increasing the rotation speed of a magneto motor as claimed in claim 1, wherein positions of said plurality of sets of magnetic sensors should not be limited, but the positioned angle of one set of said magnetic sensors will let the conduction time difference of the exciting coils of said stator portion and said rotor portion generate stronger air gap magnetic flux density and armature reaction of larger torsion coefficient $K_T$, while the positioned angle of at least another set of said magnetic sensors will let the conduction time difference of the exciting coils of said stator portion and said rotor portion generate weaker air gap magnetic flux density and armature reaction of smaller torsion coefficient $K_T$.

4. The device capable of increasing the rotation speed of a magneto motor as claimed in claim 1, wherein the selection of the detection output signals of said magnetic detection signal selection circuit is realized by referring to the level of the rotation speed of said motor to generate a rotation speed signal, and said signal terminals will let said magnetic detection signal selection circuit automatically select to output different detection output signals according to the level of the rotation speed of said motor.

5. The device capable of increasing the rotation speed of a magneto motor as claimed in claim 1, wherein the selection of the detection output signals of said magnetic detection signal selection circuit is realized to generate switching signals in manual switching way, and said signal terminals will let said magnetic detection signal selection circuit automatically select to output different detection output signals according to the state of manual switching.

6. The device capable of increasing the rotation speed of a magneto motor as claimed in claim 1, wherein said magnetic detection signal selection circuit includes a switch of mechanical type having contacts therein, and the switch is controlled by instructions of said signal terminals to output the required detection output signal.

7. The device capable of increasing the rotation speed of a magneto motor as claimed in claim 1, wherein said magnetic detection signal selection circuit includes a switching circuit therein, which can be an electronic IC without contacts like an analog IC, a digital IC, or a central processing unit, and the switching circuit is controlled by instructions of said signal terminals to output the required detection output signal.

8. The device capable of increasing the rotation speed of a magneto motor as claimed in claim 1, wherein said stator portion is an outer stator portion of a motor, and said rotor portion is a magneto inner rotor portion of the motor, a magneto inner rotor type motor.

9. The device capable of increasing the rotation speed of a magneto motor as claimed in claim 1, wherein said stator portion is an inner stator portion of a motor, and said rotor portion is a magneto outer rotor portion of the motor, i.e., a magneto outer rotor type motor.

10. The device capable of increasing the rotation speed of a magneto motor as claimed in claim 1, wherein said permanent magnet of said rotor portion is a tube-shaped magnet adhered on the surface of a magnetic conduction iron yoke for armature reaction of said rotor portion, and said plurality of sets of magnetic sensors correspond to rotary pole variation of said permanent magnet to let said rotor portion correspond to said stator portion so that an armature can react to rotate.

11. The device capable of increasing the rotation speed of a magneto motor as claimed in claim 1, wherein said permanent magnet of said rotor portion is formed by individually adhering a plurality of permanent magnets on the surface of a magnetic conduction iron yoke for armature reaction of said rotor portion, and said plurality of sets of magnetic sensors correspond to rotary pole variation of said permanent magnet to let said rotor portion correspond to said stator portion so that an armature can react to rotate.

12. The device capable of increasing the rotation speed of a magneto motor as claimed in claim 1, wherein said permanent magnet of said rotor portion is formed by individually embedding a plurality of permanent magnets into a magnetic conduction iron yoke for armature reaction of said rotor portion, and said plurality of sets of magnetic sensors correspond to rotary pole variation of said permanent magnet to let said rotor portion correspond to said stator portion so that an armature can react to rotate.

13. The device capable of increasing the rotation speed of a magneto motor as claimed in claim 1, wherein the permanent magnet of said rotor portion is another permanent magnet concentric to and synchronously rotating with said rotor portion, and the permanent magnet is for detection of rotation position of said rotor but not for armature reaction, and said plurality of sets of magnetic sensors correspond to rotary pole variation of the permanent magnet to let said permanent magnet for armature reaction of said rotor portion correspond to said stator portion so that an armature can react to rotate.

* * * * *